(12) United States Patent
Kuroda et al.

(10) Patent No.: US 6,630,957 B1
(45) Date of Patent: Oct. 7, 2003

(54) SOLID STATE IMAGING APPARATUS AND METHOD OF DRIVING THE SAME

(75) Inventors: Takao Kuroda, Osaka (JP); Masayuki Masuyama, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/241,421

(22) Filed: Feb. 2, 1999

(30) Foreign Application Priority Data

Feb. 3, 1998 (JP) .......................................... 10-021682

(51) Int. Cl.[7] .......................... H04N 5/335; H04N 3/14
(52) U.S. Cl. .................. 348/296; 348/308; 348/294; 348/295
(58) Field of Search ................................ 348/308, 294, 348/295, 296, 297, 298; 377/54, 77

(56) References Cited

U.S. PATENT DOCUMENTS

| 4,603,355 | A | * | 7/1986 | Yamada et al. ............. 348/308 |
| 4,856,033 | A | * | 8/1989 | Hirota ........................ 257/214 |
| 5,420,631 | A | * | 5/1995 | Hamasaki .................... 348/302 |
| 6,091,449 | A | * | 7/2000 | Matsunaga et al. ......... 348/308 |
| 2001/0002844 | A1 | * | 6/2001 | Orava et al. ................ 348/308 |
| 2001/0005225 | A1 | * | 6/2001 | Clark et al. ................. 348/308 |
| 2002/0101528 | A1 | * | 8/2002 | Lee et al. .................... 348/308 |

FOREIGN PATENT DOCUMENTS

| JP | 3-127567 | 5/1991 |
| JP | 9-252436 | 9/1997 |
| WO | WO 93/04556 | 3/1993 |

* cited by examiner

*Primary Examiner*—Wendy R. Garber
*Assistant Examiner*—Lin Ye
(74) *Attorney, Agent, or Firm*—Nixon Peabody LLP; Donald R. Studebaker

(57) ABSTRACT

In a solid state imaging apparatus, a normal function to read a pixel signal and an electronic shutter function are both realized by using a single shift register. The shift register successively transmits a driving signal supplied from a control unit. A selecting circuit is disposed correspondingly to each row of an imaging unit, and when the driving signal is output from a register corresponding to the row, the selecting circuit selectively executes a read operation or a reset operation in pixels belonging to the corresponding row in accordance with outputs of preceding and following registers. The driving signal is set to be differently supplied between the normal mode and the electronic shutter mode, so that outputs of preceding and following registers can be different between these modes. As a result, a read operation and a reset operation can be selectively conducted in the normal mode and the electronic shutter mode, respectively in the imaging unit.

10 Claims, 6 Drawing Sheets

SOLID STATE IMAGING APPARATUS AND METHOD OF DRIVING THE SAME

BACKGROUND OF THE INVENTION

The present invention relates to a technique to drive a solid state imaging apparatus, and more particularly, it relates to a driving technique for realizing an electronic shutter function in a solid state imaging apparatus.

An electronic shutter function in a solid state imaging apparatus is a function for adjusting a charge storage time in an imaging unit so as to electronically control an exposure time in place of a physical diaphragm function. Specifically, the electronic shutter function can be realized by discharging (resetting) a signal charge stored in each pixel at a predetermined timing different from a timing for reading a pixel signal.

In other words, in order to realize the electronic shutter function in a solid state imaging apparatus, a peripheral circuit is required to have a configuration where the imaging unit can be accessed for resetting at a timing independent of a timing for making an access for reading a pixel signal. Accordingly, a conventional solid state imaging apparatus includes a row selecting shift register for the electronic shutter function in addition to a row selecting shift register for reading a pixel signal, so as to make an access to the imaging unit for resetting by using this additional row selecting shift register. Thus, the electronic shutter function is realized in the conventional solid state imaging apparatus.

The conventional solid state imaging apparatus with the electronic shutter function has, however, the following problems:

Since a shift register occupies a comparatively large area in the entire layout of the solid state imaging apparatus, the two row selecting shift registers provided in the conventional solid state imaging apparatus can be an obstacle to downsizing and cost reduction. Moreover, since the two shift registers are independently driven, the power consumption is accordingly increased. Therefore, the two shift registers are not desirable also in view of reduction of power consumption.

SUMMARY OF THE INVENTION

The object of the invention is realizing, in a solid state imaging apparatus, both a normal function to read a pixel signal and an electronic shutter function by using a single shift register.

Specifically, the solid state imaging apparatus of this invention comprises an imaging unit including two-dimensionally arranged plural pixels; a shift register containing plural serially connected registers including registers respectively corresponding to rows or columns of the imaging unit for successively transmitting a supplied driving signal in accordance with each clock; and a driver unit including plural selecting circuits provided correspondingly to the rows or columns of the imaging unit in the same number as the number of the rows or columns, for executing a read operation or a reset operation in pixels belonging to a row or column selected in accordance with an output of a register included in the shift register, wherein each of the selecting circuits receives an output of one register, among the registers of the shift register, corresponding to a row or a column corresponding to the selecting circuit and an output of another register disposed away from the corresponding register by a predetermined number of stages in the shift register, and when the output of the corresponding register is the driving signal, selects a read operation or a reset operation in accordance with the output of the latter register and executes the selected operation in the pixels of the corresponding row or column.

In this solid state imaging apparatus, when the driving signal is output from one register included in the shift register and disposed correspondingly to a row or column of the imaging unit, the selecting circuit corresponding to that row or column selectively executes a read operation or a reset operation in the pixels of the row or column in accordance with the output of another register disposed away from the corresponding register by a predetermined number of stages in the shift register. Accordingly, by setting the supply of the driving signal to the shift register so that, when one register outputs the driving signal, the output of another register can be different between the normal mode for reading a pixel signal and the electronic shutter mode, a read operation and a reset operation can be selectively executed in the imaging unit in the normal mode and the electronic shutter mode, respectively. Therefore, the normal function to read a pixel signal and the electronic shutter function can be both realized by using one and the same shift register.

In the solid state imaging apparatus, the latter register is preferably disposed in a stage at least preceding to or following the corresponding register in the shift register. In this manner, each selecting circuit can receive the output of the register corresponding to the row or column corresponding to the selecting circuit and the output of another register disposed in a stage at least preceding to or following the corresponding register, namely, the selecting circuit can receive the outputs of the registers in two or three stages. Thus, the configuration of a driver unit can be simplified.

Also, the solid state imaging apparatus can further comprise a control unit for controlling supply of the driving signal to the shift register, and the control unit preferably controls the driving signal to be supplied to the shift register in one clock period when one of a normal mode for reading a pixel signal and an electronic shutter mode is specified and to be supplied to the shift register in at least two clock periods when the other mode is specified.

In this manner, the driving signal is supplied in one clock period in one of the normal mode and the electronic shutter mode and in at least two clock periods in the other mode. Accordingly, when the driving signal is output from one register, none of the other registers outputs the driving signal in one mode, and any of the other registers outputs the driving signal in the other mode. As a result, each of the selecting circuits can easily selectively execute a read operation or a reset operation in accordance with the presence of the driving signal output from another register.

Furthermore, in the solid state imaging apparatus, each of the selecting circuits can include a combinational circuit for receiving the output of the corresponding register and outputs of other registers disposed in preceding and following stages of the corresponding register, and in the case where the driving signal is output from the corresponding register, when any of the other registers outputs the driving signal, the selecting circuit executes one of the read operation and the reset operation, and when none of the other registers outputs the driving signal, the selecting circuit executes the other operation.

Alternatively, the method of this invention of driving a solid state imaging apparatus including an imaging unit containing two-dimensionally arranged plural pixels and a shift register containing plural serially connected registers including registers respectively corresponding to rows or columns of the imaging unit, comprises a first step of supplying a driving signal to the shift register; a second step of detecting, among the registers included in the shift register, a register outputting the driving signal; and when one register is detected to output the driving signal in the second step, a third step of selecting a read operation or a reset operation in accordance with an output of another register disposed away from the detected register by a predetermined number of stages in the shift register, and executing the selected operation in pixels belonging to a row or column corresponding to the detected register.

In this method, when one register is detected to output the driving signal, a read operation or a reset operation is selectively executed in the pixels belonging to a row or column corresponding to the detected register in accordance with the output of another register disposed away from the detected register by a predetermined number of stages in the shift register. Accordingly, by setting the supply of the driving signal to the shift register so that, when one register outputs the driving signal, the output of another register can be different between the normal mode for reading a pixel signal and the electronic shutter mode, a read operation and a reset operation can be selectively executed in the imaging unit in the normal mode and the electronic shutter mode, respectively. Therefore, the normal function to read a pixel signal and the electronic shutter function can be both realized by using one and the same shift register.

In this method, the latter register is preferably disposed in a stage at least preceding to or following the detected register in the shift register.

Furthermore, in the first step, when one of a normal mode for reading a pixel signal and an electronic shutter mode is specified, the driving signal is preferably supplied to the shift register in one clock period, and when the other mode is specified, the driving signal is preferably supplied to the shift register in at least two clock periods.

In this manner, the driving signal is supplied to the shift register in one clock period in one of the normal mode and the electronic shutter mode, and in at least two clock periods in the other mode. Accordingly, when the driving signal is output from one register, none of the other registers outputs the driving signal in one mode, and any of the other registers outputs the driving signal in the other mode. Therefore, a read operation or a reset operation can be easily selectively executed in accordance with the presence of the driving signal output from another register.

DETAILED DESCRIPTION OF THE INVENTION

An embodiment of the invention will now be described with reference to the accompanying drawings.

Figure 1:
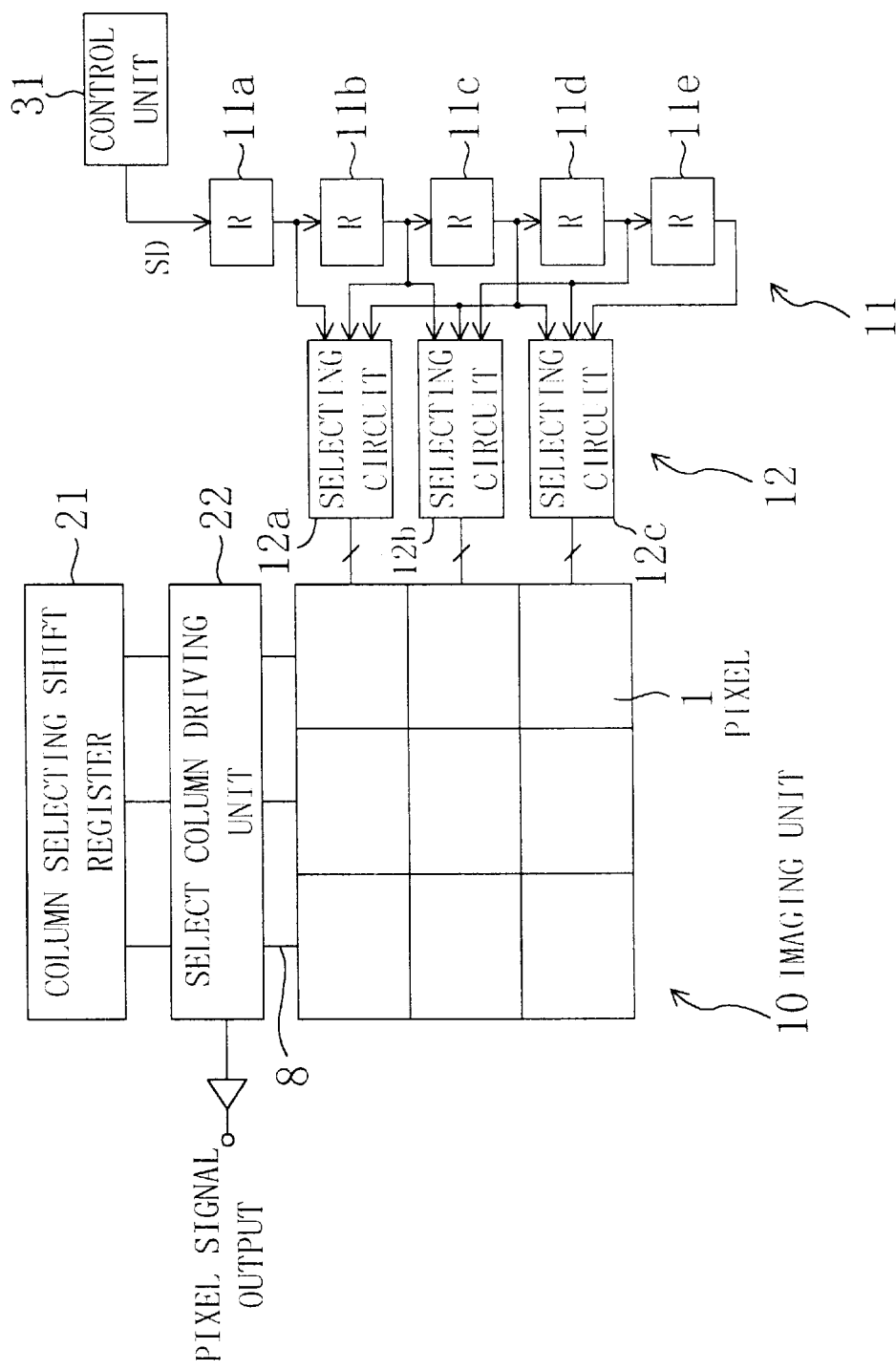
FIG. 1 is a block diagram for showing the rough configuration of a solid state imaging apparatus according to an embodiment of the invention.

FIG. 1 is a block diagram for showing the rough configuration of a solid state imaging apparatus according to the embodiment of the invention. In FIG. 1, a reference numeral 10 denotes an imaging unit including a plurality of pixels 1 arranged two-dimensionally (in three rows by three columns in FIG. 1); a reference numeral 11 denotes a row selecting shift register including plural (five in FIG. 1) serially connected registers (R) 11a through 11e and working as a shift register for successively transmitting a driving signal SD supplied from a control unit 31; and a reference numeral 12 denotes a select row driver unit including selecting circuits 12a through 12c respectively corresponding to the rows of the imaging unit 10 and working as a driver unit for executing a read operation or a reset operation in the pixels 1 belonging to the row selected in accordance with an output of the row selecting shift register 11.

Also, a reference numeral 21 denotes a column selecting shift register for selecting a column in the imaging unit 10, and a reference numeral 22 denotes a select column driver unit disposed between the imaging unit 10 and the column selecting shift register 21, for reading a potential derived from a charge stored in a selected pixel 1 as a pixel signal. The column selecting shift register 21 and the select column driver unit 22 have the same configurations as those of the conventional camera, and hence are not herein described in detail.

In the row selecting shift register 11, the registers 11b through 11d in the second through fourth stages respectively correspond to the rows of the imaging unit 10. When one of these registers 11a through 11e corresponding to one row outputs the driving signal SD, each of the selecting circuits 12a through 12c selectively executes a read operation or a reset operation in the pixels 1 belonging to the corresponding row in accordance with the outputs of the registers disposed in the stages preceding to and following that register. For example, when the driving signal SD is output from the register 11b in the second stage corresponding to the first row of the imaging unit 10, the selecting circuit 12a corresponding to the first row selectively executes a read operation or a reset operation in the pixels 1 belonging to the first row in accordance with the outputs of the registers 11a and 11c disposed in the first and third stages.

Figure 2:
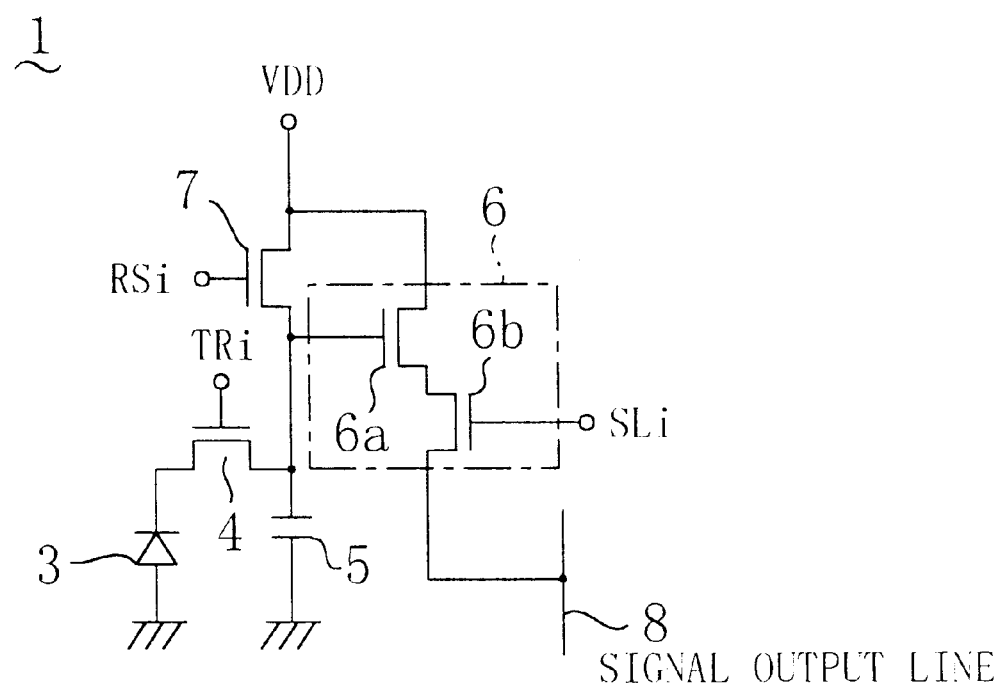
FIG. 2 is a circuit diagram of an active MOS pixel.

FIG. 2 is a diagram of an example of the circuit configuration of the pixel 1, exemplifying an active MOS pixel including a photoelectric device and a sensor portion separately. As is shown in FIG. 2, the photoelectric device 3 is connected with the sensor portion 5 through a transfer gate 4, and the sensor portion 5 is connected with a signal output line 8 through a selector portion 6 including two transistors 6a and 6b. The sensor portion 5 is also connected with a supply power VDD through a reset gate 7.

Figure 3:
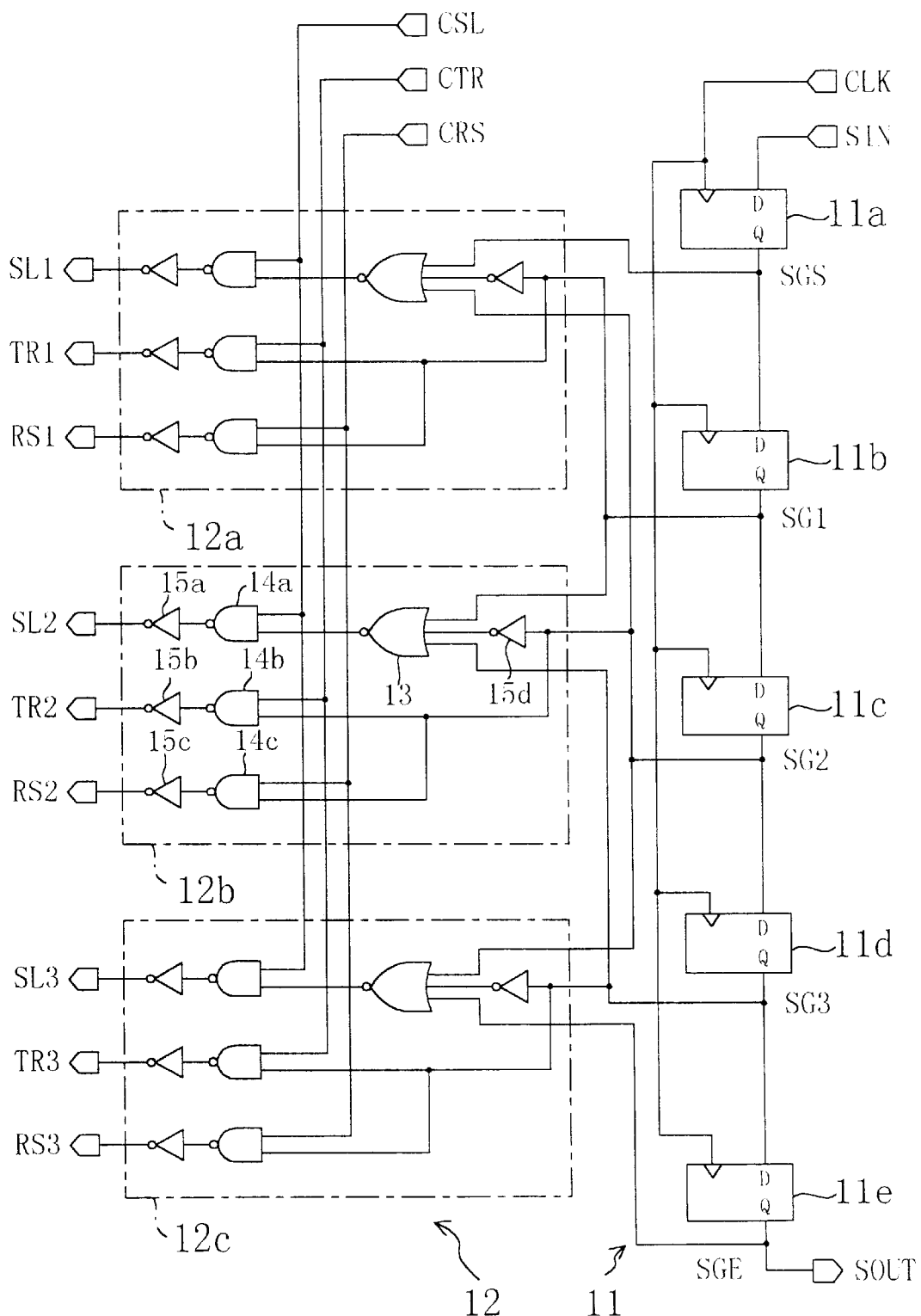
FIG. 3 is a circuit diagram for showing an exemplified configuration of a shift register and a select row driver unit of the solid state imaging apparatus of FIG. 1.

FIG. 3 is a circuit diagram for showing specific configurations of the shift register 11 and the select row driver unit 12. As is shown in FIG. 3, each of the selecting circuits 12a, 12b and 12c includes a 3-input NOR gate, three 2-input NAND gates and four inverters. In FIG. 3, SIN indicates a start pulse signal and CLK indicates a clock signal, both of which are supplied from the control unit 31. The control unit 31 supplies a logical high level to the shift register 11 as the driving signal SD by allowing the start pulse signal SIN to undergo a high transition at a rise of the clock signal CLK.

Each of the selecting circuits 12a, 12b and 12c executes a read operation and a reset operation by outputting, to the pixels 1 in the corresponding row, a select signal SLi, a transfer signal TRi and a reset signal RSi (wherein i indicates a row number and is 1, 2 or 3 in this embodiment). In a read operation, each of the selecting circuits 12a, 12b and 12c activates the select signal SLi and the transfer signal TRi. When the transfer signal TRi undergoes a high transition, a signal charge stored in the photoelectric device 3 in the pixel 1 is moved to the sensor portion 5 through the transfer gate 4, and the potential of the sensor portion 5 is output to the signal output line 8 through the selector portion 6 because the select signal SLi is at a high level. Thereafter, the reset signal RSi is activated so as to discharge the signal charge stored in the sensor portion 5. On the other hand, in a reset operation, the reset signal RSi is activated with the select signal SLi retained at a low level, so as to discharge the signal charge stored in the sensor portion 5.

Now, the circuit configuration and the operation of each of the selecting circuits 12a, 12b and 12c shown in FIG. 3 will be described by exemplifying the selecting circuit 12b provided correspondingly to the second row of the imaging unit 10.

In the selecting circuit 12b, the 3-input NOR gate 13 receives an output SG2 of the third-stage register 11c inverted by the inverter 15d, and outputs SG1 and SG3 of the second-stage and fourth-stage registers 11b and 11d. Specifically, the output of the 3-input NOR gate 13 is at a high level only when the output SG2 of the third-stage register 11c corresponding to the second row of the imaging unit 10 is at a high level (namely, the driving signal SD is output from the third-stage register 11c) and the outputs SGi and SG3 of the second-stage and fourth-stage registers 11b and 11d preceding to and following the third-stage register 11c in the shift register 11 are both at a low level (namely, the driving signal SD is output neither from the second-stage register 11b nor from the fourth-stage register 11d); and is at a low level in the other cases.

The 2-input NAND gate 14a receives the output of the 3-input NOR gate 13 and a select synchronous signal CSL, and outputs a select signal SL2 through the inverter 15a. Accordingly, when the output of the 3-input NOR gate 13 is at a high level, namely, when the output SG2 of the third-stage register 11c is at a high level and the outputs SG1 and SG3 of the second-stage and fourth-stage registers 11b and 11d are both at a low level, the select signal SL2 undergoes a high transition in synchronization with the select synchronous signal CSL.

On the other hand, the 2-input NAND gate 14b receives the output SG2 of the third-stage register 11c and a transfer synchronous signal CTR, and outputs a transfer signal TR2 through the inverter 15b. Also, the 2-input NAND gate 14c receives the output SG2 of the third-stage register 11c and a reset synchronous signal CRS, and outputs a reset signal RS2 through the inverter 15c. Accordingly, the transfer signal TR2 undergoes a high transition in synchronization with the transfer synchronous signal CTR when the output SG2 of the third-stage register 11c is at a high level, and the reset signal RS2 also undergoes a high transition in synchronization with the reset synchronous signal CRS when the output SG2 of the third-stage register 11c is at a high level.

Both the selecting circuits 12a and 12c are operated similarly to the selecting circuit 12b. Specifically, the selecting circuit 12a corresponding to the first row allows a select signal SL1 to undergo a high transition in synchronization with the select synchronous signal CSL when the output SG1 of the second-stage register 11b corresponding to the first row is at a high level and the outputs SGS and SG2 of the first-stage and third-stage registers 11a and 11c preceding to and following the second-stage register 11b in the shift register 11 are both at a low level. Also, the selecting circuit 12a allows a transfer signal TRI to undergo a high transition in synchronization with the transfer synchronous signal CTR and a reset signal RS1 to undergo a high transition in synchronization with the reset synchronous signal CRS when the output SG1 of the second-stage register 11b is at a high level.

Similarly, the selecting circuit 12c corresponding to the third row allows a select signal SL3 to undergo a high transition in synchronization with the select synchronous signal CSL when the output SG3 of the fourth-stage register 11d corresponding to the third row is at a high level and the outputs SG2 and SGE of the third-stage and fifth-stage registers 11c and 11e preceding to and following the fourth stage register 11d in the shift register 11 are both at a low level. Also, the selecting circuit 12c allows a transfer signal TR3 to undergo a high transition in synchronization with the transfer synchronous signal CTR and a reset signal RS3 to undergo a high transition in synchronization with the rest synchronous signal CRS when the output SG3 of the fourth-stage register 11d is at a high level.

Figure 4:
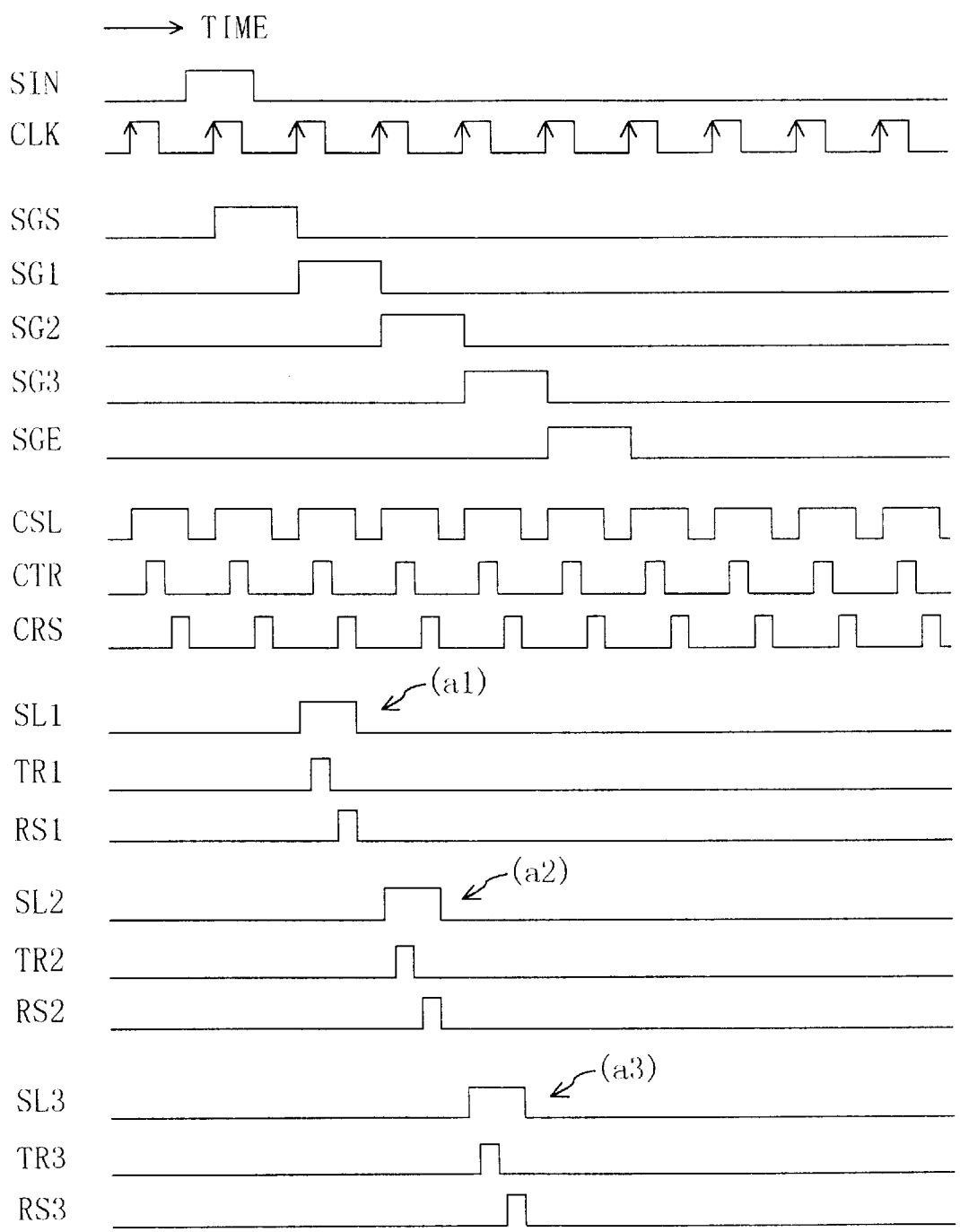
FIG. 4 is a timing chart for an operation of the shift register and the select row driver unit of FIG. 3, wherein the operation in a normal mode for reading a pixel signal is shown.
Figure 5:
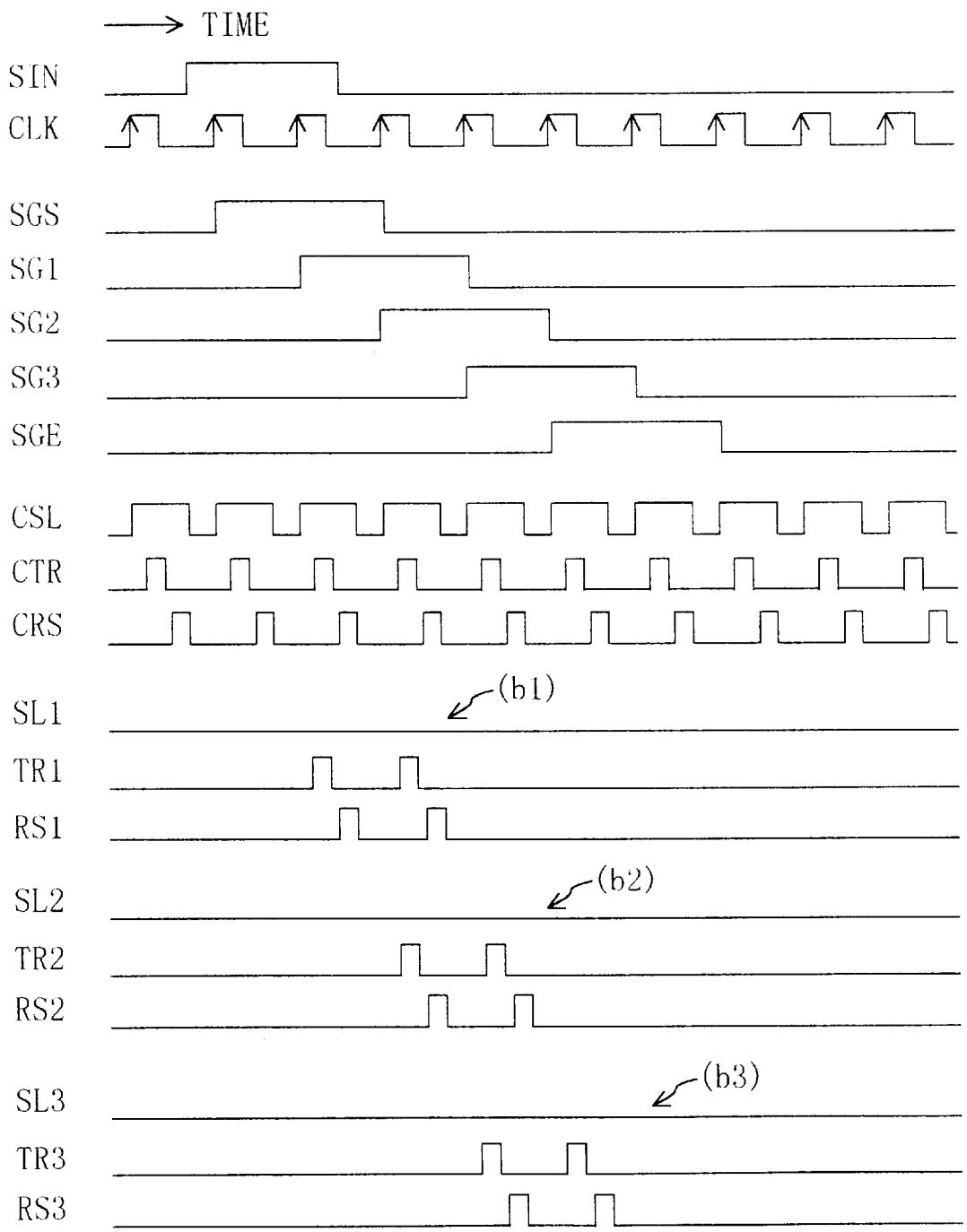
FIG. 5 is a timing chart for an operation of the shift register and the select row driver unit of FIG. 3, wherein the operation in an electronic shutter mode is shown.

FIGS. 4 and 5 are timing charts for showing the operation of the shift register 11 and the select row driver unit 12 of FIG. 3, wherein FIG. 4 shows an operation in the normal mode for reading a pixel signal and FIG. 5 shows an operation in the electronic shutter mode.

First, as is shown in FIG. 4, in the normal mode, the control unit 31 sets the start pulse signal SIN so that the driving signal SD, namely, a signal at a high level, can be input to the shift register 11 in merely one clock period. The shift register 11 successively transfers the high level signal synchronously with the clock signal CLK, thereby successively rising the outputs SGS, SG1, SG2, SG3 and SGE of the registers 11a through 11e, each of which is retained at a high level in one clock period.

In this case, as is shown as "a1" in FIG. 4, when the output SG1 of the second-stage register 11b is at a high level, the outputs SGS and SG2 of the preceding first-stage and following third-stage registers 11a and 11b are both at a low level. Therefore, the select signal SL1 undergoes a high transition in synchronization with the select synchronous signal CSL. In addition, the transfer signal TR1 undergoes a high transition in synchronization with the transfer synchronous signal CTR. Since both the select signal SL1 and the transfer signal TR1 are thus at a high level, a read operation is executed in the pixels 1 of the first row. Thereafter, the reset signal RS1 undergoes a high transition in synchronization with the reset synchronous signal CRS, so as to discharge the signal charge from the pixels 1 of the first row.

Similarly, as is shown as "a2" in FIG. 4, when the output SG2 of the third-stage register 11c is at a high level, the outputs SG1 and SG3 of the preceding second-stage and following fourth-stage registers 11b and 11d are both at a low level. Accordingly, the select signal SL2 undergoes a high transition in synchronization with the select synchronous signal SCL and the transfer signal TR2 undergoes a high transition in synchronization with the transfer synchronous signal CTR. Also, as is shown as "a3" in FIG. 4, when the output SG3 of the fourth-stage register 11d is at a high level, the outputs SG2 and SG4 of the preceding thirdstage and following fifth-stage registers 11c and 11e are both at a low level. Accordingly, the select signal SL3 undergoes a high transition in synchronization with the select synchronous signal CSL and the transfer signal TR3 undergoes a high transition in synchronization with the transfer synchronous signal CTR. Through such operations, a read operation is executed in each row of the imaging unit 10.

On the other hand, in the electronic shutter mode, as is shown in FIG. 5, the control unit 31 sets the start pulse signal SIN so that the driving signal SD, namely, a signal at a high level, can be input to the shift register 11 in two continues clock periods. As a result, the outputs SGS, SG1, SG2, SG3 and SGE of the registers 11a through 11e successively rise so as to be retained at a high level in two clock periods. Specifically, when the output of one register is at a high level, the output of either the preceding or following register is at a high level.

In this case, as is shown as "b1" in FIG. 5, when the output SG1 of the second-stage register 11b is at a high level, the output SGS of the preceding first-stage register 11a is at a high level in the first half, and the output SG2 of the following third-stage register 11c is at a high level in the second half. Accordingly, the select signal SL1 does not undergo a high transition but remains at a low level, while the transfer signal TR1 and the reset signal RS1 both undergo a high transition. Since the select signal SL1 does not undergo a high transition but remains at a low level and the transfer signal TR1 and the reset signal SR1 both undergo a high transition in this manner, a reset operation is executed in the pixels 1 of the first row.

Similarly, as is shown as "b2" in FIG. 5, while the output SG2 of the third-stage register 11c is at a high level, one of the outputs SG1 and SG3 of the preceding second-stage and following fourth-stage registers 11b and 11d is at a high level. Accordingly, the select signal SL2 does not undergo a high transition but remains at a low level, and the transfer signal TR2 and the reset signal RS2 undergo a high transition. Also, as is shown as "b3" in FIG. 5, while the output SG3 of the fourth-stage register 11d is at a high level, one of the outputs SG2 and SG4 of the preceding third-stage and following fifth-stage registers 11c and 11e is at a high level. Accordingly, the select signal SL3 does not undergo a high transition but remains at a low level, and the transfer signal TR3 and the reset signal RS3 undergo a high transition. Through such operations, a reset operation is executed in each row of the imaging unit 10. Thus, the electronic shutter function is realized.

As described so far, in the solid state imaging apparatus of this invention, when a driving signal is output from one register, a corresponding selecting circuit selectively executes either a read operation or a reset operation in pixels belonging to a corresponding row in accordance with outputs of registers disposed in the stages preceding to and following that register inca shift register. As a result, the driving signal is controlled to be supplied to the shift register in merely one clock period in the normal mode, and to be supplied to the shift register in two continuous clock periods in the electronic shutter mode. Thus, not only the normal function to read a pixel signal but also the electronic shutter function can be realized by using one and the same shift register.

The imaging unit 10 includes the pixels 1 arranged in three columns by three rows in this embodiment, but the invention is applicable to an imaging unit including pixels arranged in arbitrary numbers of columns and rows. For example, when the imaging unit includes n rows of pixels (wherein n is a positive integer), the solid state imaging apparatus includes a row selecting shift register provided with (n+2) registers including n registers respectively corresponding to the n rows of pixels and n selecting circuits respectively corresponding to the n rows of pixels. In this case, each selecting circuit is supplied with an output of the corresponding register and outputs of the preceding and following registers.

Moreover, in the solid state imaging apparatus of this embodiment, the rows and the columns in the imaging unit 10 are replaceable.

Also, the circuit configuration shown in FIG. 3 is merely an example, and any other circuit configuration can be adopted as far as either a read operation or a reset operation can be selectively executed in pixels belonging to one row in accordance with outputs of registers disposed in stages preceding to and following the corresponding register.

Furthermore, a configuration where a read operation or a reset operation is selectively executed in pixels belonging to one row in accordance with an output of a register in a stage preceding to or following the corresponding register can be easily realized. For example, each selecting circuit is supplied with an output of the corresponding register and an output of a register in the preceding stage. In response to the driving signal output from the corresponding register, when the output of the register in the preceding stage is at a low level, the select signal is allowed to undergo a high transition, and when the output of the register in the preceding stage is at a high level, the select signal is forced to be retained at a low level during two or more continuous clock periods. Thus, the same operations attained in the aforementioned embodiment can be realized.

Each selecting circuit of this embodiment uses the outputs of the registers disposed in preceding and following stages of the corresponding register for selecting a read operation or a reset operation, which does not limit the invention. Alternatively, a read operation or a reset operation can be selected in accordance with outputs of registers away from the corresponding register by a predetermined number of stages.

For example, in the case where a read operation or a reset operation is selected in accordance with outputs of registers away from the corresponding register by two stages, the 3-input NOR gate 13 of the selecting circuit 12b shown in FIG. 3 receives the outputs SGS and SGE of the first-stage and fifth-stage registers 11a and 11e in stead of the outputs SG1 and SG3 of the second-stage and fourth-stage registers 11b and 11d. In this case, the start pulse signal SIN is set so that the driving signal SD can be supplied, in the electronic shutter mode, to the shift register 11 in one clock period and in another clock period with one clock period therebetween skipped. It is noted that, in this case, registers are required to be additionally provided as a first register and a last register in the shift register 11 so as to also change the inputs of the 3-input NOR gates of the selecting circuits 12a and 12c.

Moreover, in the aforementioned embodiment, the active MOS pixel as is shown in FIG. 2 is used, but the invention is also applicable to a pixel of another type.

Figure 6A:
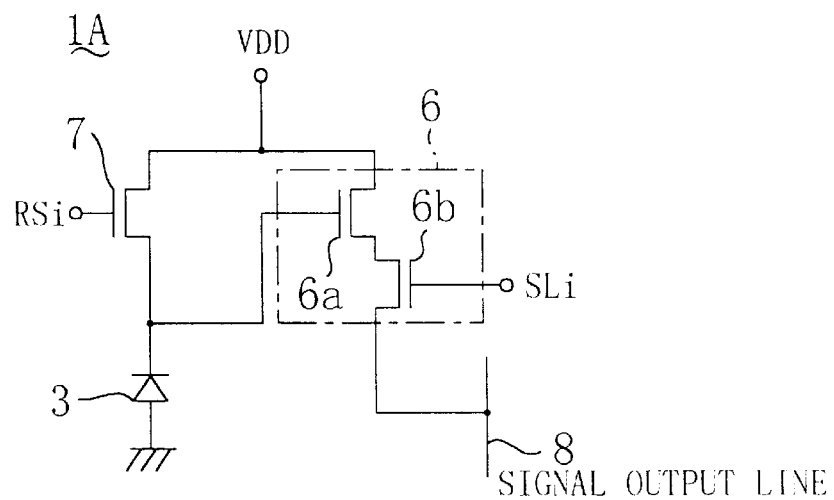
FIG. 6(a) is a circuit diagram of another active MOS pixel and FIG. 6(b) is a circuit diagram for showing an exemplified configuration of a selecting circuit used for applying the invention to the pixel of FIG. 6(a).

FIG. 6(a) shows a circuit configuration of another type pixel 1A usable in the imaging unit 10, and this pixel 1A is of an active MOS type where a photoelectric device works also as a sensor portion. As is shown in FIG. 6(a), in the active MOS pixel 1A, a photoelectric device 3 itself is connected with a signal output line 8 through a selector portion 6 including two transistors 6a and 6b, so that the potential of the photoelectric device 3 can be output to the signal output line 8 through the selector portion 6 when a select signal SLi is at a high level.

Figure 6B:
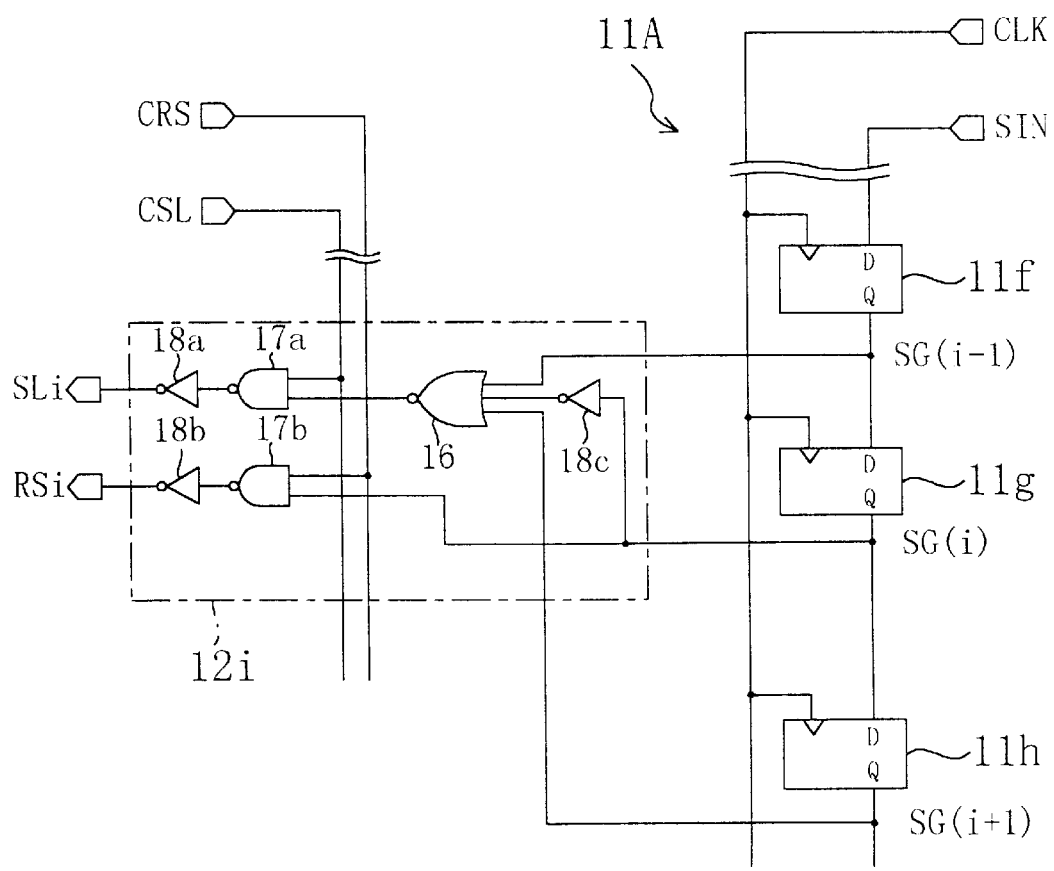

FIG. 6(b) is a circuit diagram for showing an exemplified configuration of a selecting circuit used in application of the present invention to the active MOS pixel 1A shown in FIG. 6(a). In FIG. 6(b), a selecting circuit 12i includes a 3-input NOR gate 16, two 2-input NAND gates 17a and 17b, and three inverters 18a, 18b and 18c. The 3-input NOR gate 16 receives an output SG(i) of a register 11g inverted by the inverter 18c, and outputs SG(i−1) and SG(i+1) of registers 11f and 11h. Therefore, when the output of the 3-input NOR gate 16 is at a high level, namely, only when the output SG(i) of the register 11g is at a high level and the outputs SG(i−1) and SG(i+1) of the registers 11f and 11h are both at a low level, a select signal SLi undergoes a high transition in synchronization with the select synchronous signal CSL.

By providing each row of the imaging unit 10 with the selecting circuit 12i as is shown in FIG. 6(b), the normal function to read a pixel signal and the electronic shutter function can be both realized by using a single shift register also in the imaging unit 10 including the active MOS pixels 1A shown in FIG. 6(a) in the same manner as in the aforementioned embodiment.

Furthermore, the select row driver unit of this embodiment includes plural selecting circuits respectively corresponding to the rows of the imaging unit, which does not limit the invention. Specifically, the driver unit can adopt any configuration as far as it can detect one register outputting the driving signal among plural registers included in the shift register and can selectively execute a read operation or a reset operation in pixels of the row or column corresponding to the detected register in accordance with outputs of other registers away from the detected register by a predetermined number of stages in the shift register.

Moreover, the solid state imaging apparatus can be controlled with the normal mode exchanged with the electronic shutter mode. Specifically, the driving signal can be supplied to the shift register in two continuous clock periods in the normal mode, and in merely one clock period in the electronic shutter mode. In this case, the configuration of each selecting circuit is required to be modified, for example, by inverting the output of the NOR gate 13.

In this manner, according to the present invention, the driving signal is set to be differently supplied to the shift register between the normal mode for reading a pixel signal and the electronic shutter mode so that, when one register outputs the driving signal, the output of another register can be different between the two modes. Thus, a read operation can be conducted in the normal mode and a reset operation can be conducted in the electronic shutter mode in the imaging unit. Accordingly, both the normal function to read a pixel signal and the electronic shutter function can be realized in the solid state imaging apparatus by using a single shift register.

What is claimed is:

1. A solid state imaging apparatus comprising:
   an imaging unit including two-dimensionally arranged plural pixels;
   a shift register containing plural serially connected registers including registers respectively corresponding to rows or columns of said imaging unit, for successively transmitting a supplied driving signal in accordance with each clock; and
   a driver unit including plural selecting circuits provided correspondingly to the rows or columns of said imaging unit in the same number as the number of the rows or columns, for executing a read operation or a reset operation in pixels belonging to a row or column selected in accordance with an output of a register included in said shift register,
   wherein each of said selecting circuits receives an output of one register, among the registers of said shift register, corresponding to a row or a column corresponding to said selecting circuit and an output of another register disposed away from said corresponding register by a predetermined number of stages in said shift register, and when the output of said corresponding register is said driving signal, selects a read operation or a reset operation in accordance with the output of said another register and executes said selected operation in the pixels of the corresponding row or column.

2. The solid state imaging apparatus of claim 1,
   wherein said another register is disposed in a stage at least preceding to or following said corresponding register in said shift register.

3. The solid state imaging apparatus of claim 1, further comprising a control unit for controlling supply of said driving signal to said shift register,
   wherein said control unit controls said driving signal to be supplied to said shift register in one clock period when one of a normal mode for reading a pixel signal and an electronic shutter mode is specified and to be supplied to said shift register in at least two clock periods when the other mode is specified.

4. The solid state imaging apparatus of claim 3,
   wherein each of said selecting circuits includes a combinational circuit for receiving the output of said corresponding register and outputs of other registers disposed in preceding and following stages of said corresponding register, and
   in the case where said driving signal is output from said corresponding register, when any of said other registers outputs said driving signal, said selecting circuit executes one of the read operation and the reset operation, and when none of said other registers outputs said driving signal, said selecting circuit executes the other operation.

5. The solid state imaging apparatus of claim 3,
   wherein said driving signal is at a high logical level,
   each of said selecting circuits includes a 3-input NOR gate for receiving an inverted output of said corresponding register and outputs of other registers disposed in preceding and following stages of said corresponding register, and
   in the case where the output of said corresponding register is at a high level, when an output of said 3-input NOR gate is at a high level, said selecting circuit executes one of the read operation and the reset operation, and when the output of the 3-input NOR gate is at a low level, said selecting circuit executes the other operation.

6. The solid state imaging apparatus of claim 1,
   wherein each of the pixels is an active MOS device.

7. A method of driving a solid state imaging apparatus including an imaging unit containing two-dimensionally arranged plural pixels and a shift register containing plural serially connected registers corresponding to a row or a column of said imaging unit, comprising:

a first step of supplying a driving signal to said shift register;

a second step of detecting, among said registers including in said shift register, a register outputting said driving signal; and when one register is detected to output said driving signal in said second step, a third step of selecting a read operation or a reset operation in accordance with an output of another register disposed away from said detected register by a predetermined number of stages in said shift register, and executing said selected operation in pixels belonging to a row or column corresponding to said detected register.

8. The method of driving a solid state imaging apparatus of claim 7, wherein said another register is disposed in a stage at least preceding to or following said detected register in said shift register.

9. The method of driving a solid state imaging apparatus of claim 7, wherein, in said first step, when one of a normal mode for reading a pixel signal and an electronic shutter mode is specified, said driving signal is supplied to said shift register in one clock period, and when the other mode is specified, said driving signal is supplied to said shift register in at least two clock periods.

10. The method of driving a solid state imaging apparatus of claim 7, wherein each of the pixels is an active MOS device.

* * * * *